United States Patent [19]

Izaki et al.

[11] 3,970,629
[45] July 20, 1976

[54] COMPOSITION FOR PAPER COATING
[75] Inventors: Nobujiro Izaki, Niihama; Masashi Nakayama, Osaka; Saburo Mishiba; Sadao Sekiguchi, both of Niihama, all of Japan
[73] Assignee: Sumitomo Naugatuck Co., Ltd., Japan
[22] Filed: Dec. 9, 1974
[21] Appl. No.: 531,199

Related U.S. Application Data
[63] Continuation of Ser. No. 386,289, Aug. 7, 1973, abandoned.

[30] Foreign Application Priority Data
Aug. 7, 1972 Japan................................ 47-78936

[52] U.S. Cl. ..................... 260/29.7 T; 260/29.7 W; 260/29.7 H; 260/29.7 SQ; 428/537
[51] Int. Cl.² ...................... C08L 1/02; C08L 3/04; C08L 9/08
[58] Field of Search.............. 260/29.7 T, 29.7 WA, 260/29.7 W, 29.7 H, 29.7 SQ

[56] References Cited
UNITED STATES PATENTS

| | | | |
|---|---|---|---|
| 3,142,654 | 7/1964 | Peterson........................ | 260/29.7 T |
| 3,344,103 | 9/1967 | Eilbeck et al. ................ | 260/29.7 T |
| 3,432,455 | 3/1969 | Rasicci.......................... | 260/29.7 T |
| 3,574,159 | 4/1971 | Fetter et al..................... | 260/29.7 T |

*Primary Examiner*—J. Ziegler
*Attorney, Agent, or Firm*—Stewart and Kolasch, Ltd.

[57] ABSTRACT

A composition for paper coating which comprises a pigment and, as a pigment binder, a synthetic copolymer latex comprising about 24.5 to 50 parts by weight of at least one aliphatic conjugated diolefin, about 0.5 to 10 parts by weight of at least one ethylenically unsaturated carboxylic acid and about 40 to 75 parts by weight of at least one monoolefinic monomer copolymerizable with the aliphatic conjugated diolefin and the ethylenically unsaturated carboxylic acid, the synthetic copolymer having a gel content of not more than about 60 % by weight based on the weight of the synthetic copolymer.

13 Claims, No Drawings

COMPOSITION FOR PAPER COATING

This application is a continuation of copending application Ser. No. 386,289, filed on Aug. 7, 1973.

The present invention relates to a composition for paper coating comprising a synthetic copolymer latex. More particularly, it relates to a paper coating composition containing a pigment and, as a pigment binder, a synthetic copolymer latex prepared from about 24.5 to 50 parts by weight of an aliphatic conjugated diolefin, about 0.5 to 10 parts by weight of an ethylenically unsaturated carboxylic acid and about 40 to 75 parts by weight of a monoolefinic monomer copolymerizable with the aliphatic conjugated diolefin and the ethylenically unsaturated carboxylic acid, the synthetic copolymer having a gel content of not more than about 60% by weight.

The paper coating composition of the present invention has improved properties and is particularly excellent with regard to its blister-preventing, multi-color offset ink transferable, waterproofing and pick resistant properties, especially upon use in multi-color web offset printing processes.

In recent years, considerable process has been made in offset printing processes toward multi-color and high-speed printing procedures. In order to satisfy the progress of these improved printing techniques, there has been a growing demand for a pigment binder having improved properties for the processing and coating of paper. To this end, starch, casein, synthetic copolymer latices and the like have been used as pigment binders.

For web offset printing, latices are required to have excellent wet-pick and blister-resistant properties in addition to various properties as recognized in conventional synthetic copolymer latices. Coated paper for web offset printing is shipped out in a roll form and may be distinguished from coated paper for sheet printing which is shipped out after cutting.

Heretofore, a variety of improved synthetic copolymers have been studied and widely used in processing pigment-coated paper. For example, synthetic copolymers such as butadiene-styrene-ethylenically unsaturated carboxylic acid copolymers and butadiene-methyl methacrylate-ethylenically unsaturated carboxylic acid copolymers have been employed in the prior art. However, these synthetic copolymers possess some deficiencies which render them unsuitable for web offset printing processes. For instance, some conventional synthetic copolymer latices are favorable with respect to their water resistance and pick resistance but are insufficient and unsatisfactory in offset ink transferability and blister resistance. Some other synthetic copolymer latices have good offset ink transferability and satisfactory blister resistance but are very poor in water resistance and pick resistance.

Upon printing, the ink transferability is generally affected by the nature and amount of the pigment binder and the coarseness of the pigment and depends upon the properties of the coating layer on the paper. When the pigment particles are large in size, the surface of the coated paper becomes porous, impairing the gloss and smoothness of the coated surface. This may cause an increase in the rate at which the ink permeates the coated paper and in the amount of ink transferred, but, on the other hand, tends to make the ink transferability thereof irregular. An increase in the amount of pigment binder decreases the amount of ink transferred and slows down the rate at which the ink permeates into the paper. This means that the particular synthetic copolymer latex used as the pigment binder for paper coating compositions has much to do with the absorbency of water into the coated paper and the porosity of the coating layer, and thus plays an important role with respect to the ink transferability and the ink permeation rate.

In web offset printing processes, it is necessary that the printed ink be dried almost immediately after the ink is applied. Thus, web offset printers are equpped with high-temperature, high-speed dryers. This differentiates the web offset printing process from the sheet offset printing process. The drying of the printed ink by means of such a dryer may raise blisters on both sides of the printed paper. This phenomenon is particularly observed when the application of high temperatures to the printed paper simultaneously changes the water in the coated paper into the vapor form, causing the vapor pressure to be greater than the inner strength of the coated paper. The paper, if blistered upon printing, is decreased in commercial value as a printed matter. Whether blisters are formed depends a great deal on the porosity of the coated layer on the paper, the amount of water contained in the paper and/or the inner strength of the coated paper. When the inner strength of the paper is greater than the vapor pressure produced in the paper upon drying, only few blisters are usually formed. However, in order to raise this inner strength, it is necessary to use pulps of high quality. It would be further helpful to decrease the water content in the paper and, consequently, the inner vapor pressure which is created by means of a dryer. However, this attempt would not be sufficiently satisfactory because it would be difficult to provide the paper thus manufactured in satisfactorily shaped rolls and also the low water content impairs the dimensional stability of the paper. The use of a pigment with coarse particles may improve the porosity of the paper, thus permitting the inner vapor pressure to be reduced, but its gloss, printing brightness and wet-pick resistance would be impaired. Accordingly, in order to increase the blister-preventing property of the coated paper, it is of more importance and convenience to select a pigment binder having a favorable resistance to blistering than to increase the strength of the paper itself and/or to select a special pigment therefor.

It is therefore a main object of the present invention to provide a paper coating composition having favorable blister-preventing, multi-color offset ink-transferable, water-resistant and pick-resistant properties. Another object of this invention is to provide a pigment binder to be added to a coating composition having the properties as mentioned above. A further object of the invention is to provide a pigment binder having a good wet-pick resistance when printed. Other objects, features and advantages of the invention will become apparent throughout the course of the present description and the claims.

As the result of extended studies, it has been found that a synthetic copolymer latex having a gel content of not more than approximately 60%, preferably not more than about 40%, provides a paper coating composition having favorable properties, particularly excellent in its blister-preventing property upon web offset printing and, at the same time, its water-resistant property. Such a synthetic copolymer latex comprises about 24.5 to 50 parts by weight of an aliphatic conjugated diolefin, about 0.5 to 10 parts by weight of an ethylenically unsaturated caboxylic acid and about 40 to 75 parts by weight of any other monoolefinic monomer copolymerizable with the aliphatic conjugated diolefin and the ethylenically unsaturated carboxylic acid.

In accordance with the present invention, the aliphatic conjugated diolefin may be butadiene, isoprene or the like. This monomer is used in an amount of approximately 24.5 to 50 parts by weight to provide a copolymer with an appropriate elasticity. The use of a smaller amount of the monomer may not produce an appropriate elasticity, resulting in a deficiency in its adhesive strength. The addition of a larger amount of this monomer makes the coating so soft that it lacks the necessary water-resistant property.

The ethylenically unsaturated carboxylic acid includes, for example, acrylic acid, methacrylic acid, maleic acid, fumaric acid, itaconic acid and the like. Anhydrides and monoalkyl esters of dicarboxylic acids may be also used. These ethylenically unsaturated carboxylic acids function to improve the adhesive property of the coating, increasing the mechanical strength of the latex produced. A conventional waterproofing agent may be generally used in the composition, thereby permitting the carboxylic acid to react therewith to form a cross linked structure and providing a coating impervious to water. The ethylenically unsaturated carboxylic acid is preferably used in an amount of about 0.5 to 10 parts by weight.

The monoolefinic monomer copolymerizable with the conjugated diolefin and the ethylenically unsaturated carboxylic acid includes, for example, an aromatic vinyl monomer (e.g. styrene, alpha-methylstyrene, vinyl toluene), an acrylate monomer (e.g. methyl acrylate, ethyl acrylate, butyl acrylate, 2-ethylhexyl acrylate, lauryl acrylate, 2-hydroxyethyl acrylate, 2-hydroxypropyl acrylate, glycidyl acrylate), a methacrylate monomer (e.g. methyl methacrylate, ethyl methacrylate, 2-hydroxyethyl methacrylate, 2-hydroxypropyl methacrylate, glycidyl methacrylate), acryl amide, N-methylolacryl amide, acrylonitrile and the like. These monomers can be easily copolymerized with the aliphatic conjugated diolefin and the ethylenically unsaturated carboxylic acid. The monoolefinic monomer is preferably used in an amount of about 40 to 75 parts by weight. It is preferred to employ styrene or methyl methacrylate or their mixture in an amount of not less than about 80% by weight based on the total amount of the monoolefinic monomer.

In the production of the synthetic copolymer latex according to the present invention, there is used a chain transfer agent which not only plays the role of regulating the molecular weight of the synthetic copolymer but also functions to prevent the formation of a three-dimensional structure between the double bonds present in the starting monomers and remaining in the produced polymer during the polymerization. The use of such a chain transfer agent can adjust the gel content of the synthetic copolymer, which may provide a paper coating composition excellent in its blister-preventing and water-resistant properties during web offset printing processes. Examples of the chain transfer agent are acrolein, methacrolein, allylalcohol, 2-ethylhexyl thioglycolate, mercaptans (e.g. octyl mercaptan, n-dodecyl mercaptan, t-dodecyl mercaptan, n-hexadecyl mercaptan, mixed t-mercaptans), thiuram type sulfides (e.g. tetraethylthiuram sulfide, dipentamethylenethiuram hexasulfide), haloalkyl compounds (e.g. carbon tetrachloride, methylene chloride, carbon tetrabromide, ethylene bromide), hydrocarbons (e.g. pentaphenylethane), etc. The chain transfer agent may be used alone or in admixture and also added simultaneously or continuously. The agent may be employed as a mixture with each of the monomers.

The amount of the chain transfer agent is one of the most important key factors to reduce the gel content of the copolymer low enough to meet the present invention. In general, a larger amount of the chain transfer agent may result in a lower gel content. Since, however, the gel content is also influenced by various other factors such as polymerization temperature, conversion, monomer charge technique and the like, the amount of the chain transfer agent may be decided appropriately in each case by taking the other factors into consideration. For instance, the use of about 0.6 to 0.8 part by weight or more of a chain transfer agent (e.g. dodecyl mercaptan) per 100 parts by weight of the total amount of the monomers is proper in case of the polymerization being effected at a temperature of about 50° to 70°C in a conversion of around 95 to 100%. Further, for instance, the use of about 0.1 to 0.2 part by weight of such chain transfer agent may be appropriate in case of the polymerization being carried out at a temperature of about −5° to 10°C in a conversion of around 60%. When the temperature is higher, the amount of the chain transfer agent may be generally increased. When the conversion is lower, the amount of the chain transfer agent may be usually decreased.

In this connection, it may be noted that such a copolymer having a low gel content as in this invention has never been used for paper coating. In fact, the gel contents of the latices for paper coating as presently available in the market are so high as shown below:

| Tradename | Gel content (%) | Manufacturer |
| --- | --- | --- |
| Dow latex 620 | 86 | Dow Chemical |
| Dow latex 636 | 89 | Dow Chemical |
| Dow latex 680 | 83 | Dow Chemical |
| JSR 0692 | 85 | Japan Synthetic Rubber |
| JSR 0668 | 92 | Japan Synthetic Rubber |
| Naugatex 2752 | 93 | Uniroyal |
| Emulsion rhodopas SB-023 | 81 | Rhone Poulence |

Note: All these latices contain unsaturated carboxylic acid modified styrene-butadiene rubber as the main constituent.

An emulsifying agent or emulsifier may be used in the present invention. Satisfactory emulsifiers include anionic surfactants such as alkali metal alkyl sulfates, alkali metal alkyl aryl sulfonates, and alkali metal sulfonated alkyl esters. Typical of these well known emulsifiers are sodium dodecyl benzene sulfonate, sodium lauryl sulfate, sodium di-secondary butyl naphthalene sulfonate, sodium dioctyl sulfosuccinate, disodium dodecyl diphenyl ether disulfonate and sulfuric acid esters of a higher alcohol, alkylaryl sulfonates, alkylnaphthalene sulfonates and their derivatives, alkyl sulfonates, sulfonic acid salts of alkyl succinates, and sulfonic acid esters and phosphoric acid ester salts of non-ionic emulsifying agents. Nonionic emulsifiers such as polyoxyethylene alkyl ethers, polyoxyethylene alkyl phenol ethers and polyethylene glycols may be used with said anionic emulsifier.

A polymerization initiator may be, for example, persulfates, inorganic peroxides (e.g. hydrogen peroxide), organic peroxides (e.g. cumene hydroperoxide, lauroyl peroxide, diisobutylbenzoyl peroxide) and so-called "redox-type" catalysts in which said oxidation catalyst is used with a reducing agent such as, for example, sodium hyposulfide and sulfonic acid salts of formaldehyde. A variety of electrolytes, polymerization accelerators or chelating agents conventionally employed for the polymerization of a synthetic copolymer latex also may be used with said emulsifier and/or polymerization initiator.

The polymerization of the present invention may be effected at low temperatures when a redox-type polymerization initiator is used or at high temperatures when any other polymerization initiator is employed. The monomers and/or the emulsifiers may be introduced during the course of the polymerization, but the order of the introduction of the reactants and reagents is not critical in the present invention so that it should be selected depending upon the kind and nature thereof.

After the monomers are polymerized up to a desirable conversion, the polymerization is stopped, and a shortstop agent, a pH control agent and/or a stabilizer are optionally added thereto. The thus obtained copolymer latex may be stored in a tank after stripping the residual monomer.

The use of a shortstop agent is usually preferred, because it is effective to suppress the increase of the gel content after polymerization, e.g. during the monomer recovery process, in storage, in shipment, etc. Examples of the short stop agent are carbamates, thiurams, sodium thiosulfate, hydroxylamine sulfate, hydroquinone, thiourea, etc. When a shortstop agent is not used, the gel content may increase over 60% depending upon the storage conditions before use and, in such case, the latex does not meet the requirement of this invention.

The synthetic copolymer produced according to the present invention may be employed in admixture with a pigment, a pigment binder, and/or a waterproofing agent conventionally employed for coating paper and/or any other agent usually used for pigment coating. The pigment may include, for example, clay, titanium dioxide, satin white or calcium carbonate; the pigment co-binder may be, for example, casein, starch and starch derivatives thereof or polyvinyl alcohol; and the waterproofing agent may be exemplified by a melamine-formaldehyde resin, an ureaformaldehyde resin or a polyamide resin.

The compositions for coating paper according to the present invention have an excellent blister-prevention property and improved properties of water-resistance, pick resistance and ink transferability upon use in the web offset printing process. The paper coating composition of the invention also provides a excellent gloss on the coated paper.

The following examples are given merely as illustrative of the details of the specific embodiments of the present invention, but are not intended to be limiting thereof.

EXAMPLE 1

Into a 10-liter autoclave there was introduced 32 parts of butadiene, 55 parts of styrene, 10 parts of methyl methacrylate, 1.5 parts of acrylic acid, 1.5 parts of fumaric acid, 0.7 parts of sodium hydrogen carbonate, 0.8 parts of potassium persulfate, 100 parts of water, 1.3 parts of sodium alkylbenzene sulfonate and a chain transfer agent as shown below, and the mixture was stirred at 60°C for 14 hours to give a synthetic copolymer latex. The conversion into the copolymer was 98%, and no coagulants were produced. The average particle diameter of the copolymer in an aqueous dispersion was about 2,000 angstroms.

Table 1 below shows the printing characteristics of paper coated by a variety of the paper coating compositions. In the table, the copolymer latices have the following kinds and amounts of chain transfer agents:

| Copolymer latex | Chain transfer agent | Amount, parts by weight |
|---|---|---|
| A | n-dodecyl mercaptan | 0.3 |
| B | t-dodecyl mercaptan | 0.6 |
| C | t-dodecyl mercaptan | 1.2 |
| D | octyl mercaptan* | 1.2 |
| E | none | — |

*Added intermittently

Latex E was produced with the same components as A to D but without the chain transfer agent, as shown above, at a polymerization temperature of 60°C. Latex E has a particule size of about 2,800 angstroms and a gel content of 95%. Copolymer latex F, also used in the tests, is a commercially available product. Latices A, E and F were used for comparison.

Using these copolymer latices, coating compositions were prepared with the following ingredients:

| Ingredients | Amounts, parts by weight |
|---|---|
| Ultra-White 90$^R$ | 80 |
| Aluminum hydroxide | 20 |
| Denaturated starch | 7 |
| Latex | 12 |
| Water-resistant agent | 0.35 |
| Dispersant | 0.25 |

The compositions were adjusted so as to contain 45% of solid materials and were then coated on bleached sulfate paper. The coated paper was dried and subjected to a "super calender" treatment. The paper thus obtained was tested with respect to its various characteristics. The results are shown in Table 1:

Table 1

| Characteristics | Copolymer latices | | | | | |
|---|---|---|---|---|---|---|
| | A | B | C | D | E | F |
| Gel content, % | 85 | 55 | 40 | 14 | 95 | 90 |
| Wet-pick resistance | 2.8 | 2.4 | 2.4 | 2.0 | 4.0 | 2.8 |
| Dry-pick resistance | 2.2 | 2.2 | 2.2 | 2.4 | 4.5 | 2.4 |
| Ink transferability | 2.6 | 2.4 | 2.4 | 2.4 | 3.0 | 3.0 |
| Blister resistance | 4.3 | 3.0 | 2.2 | 1.5 | 3.5 | 4.7 |
| Print gloss, % | 76 | 77 | 79 | 78 | 72 | 77 |
| Air permeability, c.c./min. | 17 | 18 | 18 | 19 | 25 | 17 |

In order to determine the gel content of the synthetic copolymer, the sol content of a latex film was measured and calculated in terms of the gel content of the synthetic copolymer. Thus, the latex film (1 g) prepared by drying the copolymer latex at room temperature was dissolved in benzene (400 cc.) and, after being left for 48 hours, the solution was filtered with a filter paper (No. 2). The filtrate was dried at 70°C to measure the sol content.

The wet-pick resistance was observed with the naked eye as to the extent to which the wet-pick of the coating occurred. These tests were conducted with a test sample paper strip coated with the copolymer latex on which the printing was effected with an offset ink of a relatively high tack value by an RI-type printer immediately after the coated paper had been made wet by a damping roller.

The dry-pick resistance was observed with the naked eye as the adhesive strength of the coating with respect to the extent to which the printed area was picked off. This test was made with coated paper which was printed one over another with a commercially available offset ink by an RI test printer.

The ink transferability upon offset printing was observed with the naked eye from the printed ink density. The printing was effected, as with the test on wet-pick resistance, using an ink of a very low tack value not to produce any pick-off.

The resistance to blistering upon web offset printing was observed with the naked eye as to the extent to which the coated paper was blistered. The test sample papers were previously impregnated with moisture by leaving them in a box having a 90% RH for 2 days. The moistened paper was printed with a heat-set type ink and immediately thereafter dried by an improved pendulum-type blister tester (See: Wink, W.A.; Tappi, 50(7); 102A (1967)). This tester is equipped with a heating section designed to raise the predetermined temperature of a test sample up to 350°C within about one second. In this test, the temperature was set at 180° ± 5°C and the duration of time for drying was 1.0 ± 0.1 second. The paper tested had a moisture content of 7.5 ± 0.5%. The test results are given as an average for each of the six test samples.

The results observed with the naked eye were roughly classified into five classes by their exent or conditions; the best results are shown as numeral "1", and the worst as numeral "5".

The print gloss was measured by a glossmeter on the coated paper printed by an RI-type test printer with 0.4 cc. of a commercially available offset ink. The printed paper was left for one day and then subjected to the measurement.

The air permeability was measured with an Emilgryner porosity meter in accordance with JIS (Japanese Industrial Standard) designation C-2111.

As shown in Table 1, paper coated by the paper coating compositions of the present invention using the synthetic copolymer having a low gel content was considerably superior in its wet-pick resistance and blister-resistant properties as compared with the coated paper tested for comparison. The papers coated by the comparative test sample A and by the latex F available on the market were inferior in their resistance to blistering. The comparative test sample E has a favorable air permeability and a fairly good blister-resistant property, but is extremely unsatisfactory with respect to its wet-pick and dry-pick resistances, and printing gloss quality.

EXAMPLE 2

In substantially the same manner as in Example 1, there were prepared the following synthetic copolymers:

Table 2

| Ingredients, parts by weight | Copolymer latices | | | | |
|---|---|---|---|---|---|
| | G | H | I | J | K |
| Butadiene | 34 | 34 | 34 | 36 | 40 |

Table 2-continued

| Ingredients, parts by weight | Copolymer latices | | | | |
|---|---|---|---|---|---|
| | G | H | I | J | K |
| Styrene | 52.75 | 51.5 | 55.5 | — | 56.5 |
| Methyl methacrylate | 10 | 10 | 12 | 62.5 | — |
| 2-Hydroxylethyl acrylate | 2 | — | — | — | — |
| Glycidyl methacrylate | — | 2 | — | — | — |
| Fumaric acid | 0.75 | 1.5 | 1.5 | — | 1.5 |
| Acrylic acid | 0.5 | 1.0 | 1.0 | 1.5 | 2.0 |
| t-Dodecyl mercaptan | 1.3 | — | 1.0 | — | 1.0 |
| Mixed t-mercaptans | — | 1.2 | — | — | — |
| Octyl mercaptan | — | — | — | 0.4 | — |
| Gel content, % | 15 | 28 | 21 | 5 | 45 |

Using these five synthetic copolymers latices, paper coating colors were prepared by the procedure of Example 1, and the coated paper was tested as to the various printability properties in the same manner as above. The results are shown below in Table 3:

Table 3

| Characteristics | Copolymer latices | | | | | |
|---|---|---|---|---|---|---|
| | G | H | I | J | K | F |
| Gel content, % | 15 | 28 | 21 | 5 | 45 | 90 |
| Wet-pick resistance | 2.0 | 1.8 | 1.7 | 3.0 | 3.7 | 2.8 |
| Dry-pick resistance | 1.8 | 1.4 | 1.7 | 2.0 | 1.3 | 2.4 |
| Ink transferability | 1.6 | 1.8 | 2.0 | 1.5 | 2.3 | 3.0 |
| Blister-resistance | 1.3 | 2.0 | 1.8 | 1.0 | 2.7 | 4.7 |
| Print gloss, % | 78 | 79 | 79 | 78 | 78 | 77 |
| Air permeability, c.c./min. | 20 | 18 | 19 | 19 | 18 | 17 |

Table 3 shows that a decrease in the gel content of the synthetic copolymer latices results in unexpectedly better properties, including blister-resistance, water-resistance, adhesiveness and ink transferability, as compared with those that were heretofore known and used.

The present invention being thus described, it will be obvious that the same way be varied in many ways. Such variations are not to be regarded as a departure from the spirit and scope of the invention, and all such modifications as would be obvious to one skilled in the art are intended to be included herein.

What is claimed is:

1. A paper coating composition having improved blister-preventing, ink transferability, water-resistant and pick-resistant properties which comprises a pigment and, as a pigment binder, a synthetic copolymer latex consisting essentially of from 24.5 to 50 parts by weight of at least one aliphatic conjugated diolefin, from 0.5 to 10 parts by weight of at least one ethylenically unsaturated carboxylic acid and from 40 to 75 parts by weight of at least one monoolefinic monomer copolymerizable with the aliphatic conjugated diolefin and the ethylenically unsaturated carboxylic acid, the gel content of said copolymer being not more than 40% by weight based on the weight of the synthetic copolymer.

2. The paper coating composition according to claim 1, wherein the aliphatic conjugated diolefin is a member selected from the group consisting of butadiene and isoprene.

3. The paper coating composition according to claim 1, wherein the ethylenically unsaturated carboxylic acid is a member selected from the group consisting of acrylic acid, methacrylic acid, maleic acid, fumaric acid and itaconic acid and the anhydrides and monoalkyl esters thereof.

4. The paper coating composition according to claim 1, wherein the monoolefinic monomer is a member selected from the group consisting of aromatic vinyl monomers, acrylic monomers, methacrylic monomers, acrylamide, N-methylolacrylamide and acrylonitrile.

5. The paper coating composition according to claim 1, wherein the monoolefinic monomer includes from about 10 to 60 parts by weight of styrene per said 40 to 75 parts by weight of monoolefinic monomer.

6. The paper coating composition according to claim 1, wherein the monoolefinic monomer includes styrene and/or methylmethacrylate in an amount of not less than 80% by weight based on the weight of the monoolefinic monomer.

7. The paper coating composition according to claim 1, wherein the monoolefinic monomer includes 1 to 5 parts by weight of 2-hydroxyethyl acrylate and/or glycidyl methacrylate.

8. The paper coating composition according to claim 1, wherein the pigment is a member selected from the group consisting of satin white, calcium carbonate, aluminium hydroxide, zinc oxide and clay.

9. The paper coating composition according to claim 1, wherein any other pigment binder is additionally contained therein.

10. The paper coating composition according to claim 9, wherein the additional pigment binder is a member selected from the group consisting of modified starch, casein, soybean protein, carboxymethylcellulose, polyvinyl alcohol, polyvinyl acetate emulsion, acrylic copolymer emulsion, ethylene-vinyl acetate copolymer emulsion, hydroxyethylcellulose and sodium alginate.

11. The paper coating composition according to claim 1, wherein a shortstop agent is contained therein.

12. The paper coating composition according to claim 11, wherein the shortstop agent is a member selected from the group consisting of carbamates, thiurams, sodium thiosulfate, hydroxylamine sulfate, hydroquinone and thiourea.

13. A web offset printing paper coating with the paper coating composition according to claim 1.

* * * * *